(12) United States Patent
Bahtijaragic

(10) Patent No.: US 11,018,486 B2
(45) Date of Patent: May 25, 2021

(54) MODULE OF A SEAL OR TRANSITION

(71) Applicant: Roxtec AB, Karlskrona (SE)

(72) Inventor: Almir Bahtijaragic, Lyckeby (SE)

(73) Assignee: ROXTEC AB, Karlskrona (SE)

( * ) Notice: Subject to any disclaimer, the term of this patent is extended or adjusted under 35 U.S.C. 154(b) by 142 days.

(21) Appl. No.: 16/062,564

(22) PCT Filed: Apr. 27, 2016

(86) PCT No.: PCT/SE2016/050372
§ 371 (c)(1),
(2) Date: Jun. 14, 2018

(87) PCT Pub. No.: WO2017/105313
PCT Pub. Date: Jun. 22, 2017

(65) Prior Publication Data
US 2018/0372247 A1 Dec. 27, 2018

(30) Foreign Application Priority Data
Dec. 18, 2015 (SE) .................................. 1551675-0

(51) Int. Cl.
*H02G 3/22* (2006.01)
*F16L 5/08* (2006.01)
(Continued)

(52) U.S. Cl.
CPC ................. *H02G 3/22* (2013.01); *F16L 5/08* (2013.01); *F16L 5/14* (2013.01); *H01R 13/5205* (2013.01)

(58) Field of Classification Search
CPC ....... H02G 3/22; F16L 5/08; F16L 5/10; F16J 15/104; H01R 13/5205
See application file for complete search history.

(56) References Cited

U.S. PATENT DOCUMENTS 5,783,776 A * 7/1998 Birmingham ............. F16L 5/08
174/657
7,631,880 B2 12/2009 Hellkvist
(Continued)

FOREIGN PATENT DOCUMENTS

CN 1535492 10/2004
CN 202797816 U 3/2013
(Continued)

OTHER PUBLICATIONS

Machine Translation of KR20100008059 retreived from espace.net on Jan. 2, 2020.*
(Continued)

*Primary Examiner* — Nicholas L Foster
(74) *Attorney, Agent, or Firm* — Merchant & Gould P.C.

(57) ABSTRACT

The present invention concerns a module (1) of a seal or transition for cables or wires, which module (1) is to be placed inside a frame (10) together with one or more compression units (12). The module (1) comprises two module halves (2). Each module half comprises an outer part (3, 17, 19, 21, 23, 25, 27, 30, 33). The outer part has a straight section (3') and two end sections (3") at the ends of the straight section and placed perpendicular to the straight section, giving a U-form in end view. An inner part (5, 18, 20, 22, 24, 26, 28, 31, 34) is placed in a recess (4) formed between the end sections of the outer part (3, 17, 19, 21, 23, 25, 27, 30, 33). The inner part (5, 18, 20, 22, 24, 26, 28, 31, 34) has a number of layers (6).

10 Claims, 3 Drawing Sheets

(51) Int. Cl.
*F16L 5/14* (2006.01)
*H01R 13/52* (2006.01)

(56) References Cited

U.S. PATENT DOCUMENTS

| | | | | |
|---|---|---|---|---|
| 8,541,699 | B2* | 9/2013 | Milton | H02G 3/22 174/659 |
| 8,621,796 | B2* | 1/2014 | Egritepe | F16L 7/02 52/220.8 |
| 8,806,713 | B2* | 8/2014 | Andersson | F16L 5/08 16/2.2 |
| 8,852,477 | B2* | 10/2014 | Satou | B26D 3/003 264/154 |
| 9,291,268 | B2* | 3/2016 | Kurz | F16L 5/08 |
| D809,466 | S* | 2/2018 | Bahtijaragic | D13/155 |
| 10,746,325 | B2* | 8/2020 | Fagerberg | H02G 3/22 |
| 2003/0110719 | A1* | 6/2003 | Broder | F16L 5/08 52/220.8 |
| 2006/0272241 | A1* | 12/2006 | Kreutz | F16L 5/08 52/220.1 |
| 2007/0216110 | A1* | 9/2007 | Stuckmann | H02G 3/088 277/607 |
| 2010/0212107 | A1* | 8/2010 | Milton | H02G 15/007 16/2.1 |
| 2011/0156354 | A1* | 6/2011 | Egritepe | F16L 5/08 277/314 |
| 2011/0248453 | A1* | 10/2011 | Johansson | F16L 5/08 277/602 |
| 2012/0013079 | A1* | 1/2012 | Andersson | H02G 3/22 277/606 |
| 2012/0018961 | A1* | 1/2012 | Andersson | F16L 5/08 277/627 |
| 2012/0266409 | A1* | 10/2012 | Andersson | F16L 5/08 16/2.2 |
| 2013/0113166 | A1 | 5/2013 | Hjerpe | |
| 2013/0328271 | A1* | 12/2013 | Kurz | F16J 15/104 277/314 |
| 2014/0077409 | A1* | 3/2014 | Satou | G02B 6/4444 264/154 |
| 2016/0097470 | A1 | 4/2016 | Johansson | |
| 2016/0281884 | A1* | 9/2016 | Johansson | H02G 3/22 |
| 2019/0154172 | A1* | 5/2019 | Fagerberg | F16L 5/08 |

FOREIGN PATENT DOCUMENTS

| | | |
|---|---|---|
| CN | 2003309371 U | 11/2013 |
| CN | 105020536 A | 11/2015 |
| DE | 202006004512 U | 7/2006 |
| EP | 1843071 A1 | 10/2007 |
| EP | 2396863 A2 | 12/2011 |
| KR | 20100008059 U | 8/2010 |
| RU | 2270392 C2 | 5/2005 |
| RU | 2537459 C2 | 3/2013 |
| WO | 03/052895 A1 | 6/2003 |
| WO | 2008140399 A1 | 11/2008 |
| WO | 2010089285 A2 | 8/2010 |
| WO | WO 2010/089286 A2 | 8/2010 |
| WO | WO 2015/065256 A1 | 5/2015 |

OTHER PUBLICATIONS

Chinese Search Report for corresponding CN Application No. 201680073534.4 dated Jul. 23, 2019 (translation enclosed), 11 pages.
Russian Search Report for corresponding RU Application No. 2018126035/07 dated Aug. 28, 2019 (7 pages).
Search Report for European Patent Application No. 16876140.1, dated Apr. 2, 2019.
International Search Report and Written Opinion for PCT/SE2016/050372 dated Sep. 2, 2016.
Chinese Search Report for CN Application No. 201680073534.4 dated Apr. 19, 2020 with English translation.

* cited by examiner

MODULE OF A SEAL OR TRANSITION

This application is a National Stage Application of PCT/SE2016/050372, filed 27 Apr. 2016, which claims the benefit of priority to Swedish Patent Application No. 1551675-0, filed 18 Dec. 2015, which applications are incorporated herein by reference. To the extent appropriate, a claim of priority is made to each of the above disclosed applications.

TECHNICAL FIELD

The present invention concerns a module of a seal or transition for cables or wires.

BACKGROUND

The module of the present invention is intended to be used in a seal, lead-through or transit system for cables, wherein the seal etc. comprises a frame, inside of which frame one or more modules and one or more compression units are received. Such seals etc. are previously known having modules of an elastic material, such as rubber or plastics. The compression unit is placed inside the frame in such a way that when the compression unit is expanded the modules will be compressed around the cables.

Seals or transitions of the above kind are used for sealing in many different environments, such as for cabinets, technical shelters, junction boxes and machines. They are used in different industrial environments, such as automotive, telecom, power generation and distribution, as well as marine and offshore. The seals or transitions may have to seal against fluid, gas, fire, rodents, termites, dust, moisture etc. and may receive cables, waveguides or wires for electricity, communication, computers etc.

Modules of different kinds for cables, pipes or wires having a circular cross section are commonly known. Such modules are normally used in transitions or seals comprising a frame, whereby one or more modules are placed inside the frame together with one or more compression units. For cables etc. having other cross section forms than circular, it is fairly common to have specialized solutions. One example of a solution for flat cables is shown in WO 2004/112211.

SUMMARY

One object of the present invention is to be able to receive cables etc. of different cross section forms without having to adapt the normally used frames, compression units and possible other parts of ordinary seals or transitions.

The modules of the present invention have been developed for receiving flat cables. Each module has a number of layers that can be removed in order to adapt the module to flat cables of different sizes. Even if the modules have mainly been developed with flat cables in mind, a skilled person realizes that slightly modified modules of this kind may also be used for cables of other cross section forms, such as rectangular, elliptic and circular.

According to one aspect of the invention modules are formed by two module halves, wherein each module half has an outer part and an inner part, placed in a recess of the outer part.

According to a further aspect of the invention the inner part of each module half is made of a softer material than the outer part. The combination of different material characteristics enables higher tolerance in view of cable dimensions and the softer material of the inner part gives higher compression in the area of said softer material than for a harder material.

Further objects and advantages of the present invention will be obvious to a person skilled in the art when reading the detailed description below of embodiments of the present invention.

BRIEF DESCRIPTION OF THE DRAWINGS

The invention will be described further below by way of example and with reference to the enclosed drawings. In the drawings.

DETAILED DESCRIPTION

Figure 1:
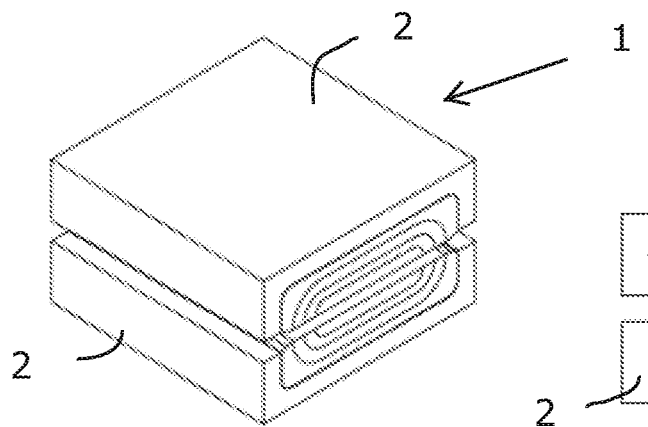
FIG. 1 is a perspective view of a module according to the present invention.

The module 1 shown in FIG. 1 is formed of two identical module halves 2. Each module half 2 comprises an outer part 3, having a recess 4, and an inner part 5, placed inside the recess 4 of the outer part 3. The inner part 5 fills out the recess 4 of the outer part 3. The recess 4 extends the total length of the outer part 3, giving the outer part 3 a U form in end view. Thus, as seen in end view the outer part 3 has a straight section 3' with two end section 3" at each end of the straight section 3'. The end sections 3" are perpendicular to the straight section 3' of the outer part 3. In the shown embodiment the inner part 5 is fastened to the outer part 3 by means of an adhesive. A person skilled in the art realizes that the inner part 5 can be received in the recess 4 of the outer part 2 in different ways. It may for instance be by means of welding or form fitting.

The inner part 5 of each module half 2 has a number of layers 6. One or more of said layers 6 may be removed, in order to adapt the inner dimension of the module 1 to a flat cable to be received inside the module 1. The layers 6 of the inner part 5 are formed and separated by cuts 7. The cuts 7 may be formed in different ways, such as by punching or moulding. In one embodiment the cuts 7 are formed by means of a water jet. The cuts 7 ends shortly before an outer surface of the inner part 5, giving material bridges 8. The material bridges 8 are weak enough to be broken by hand. The material bridges 8 have a thickness of about 0.5 mm in one embodiment. The layers 6 have a thickness of at least 1.5 mm.

The cuts 7 and thereby also the layers 6 have a straight central section 7' and a curved section 7" at each end of the straight section 7'. Said curved sections 7" have the form of a quarter of a circle. The curved sections 7" of the cuts 7 are directed away from the outer part 3 of the module half 2. By means of the form of the cuts 7, the module 1 can be adjusted to flat cables of different sizes, by removing one or more of the layers 6.

In the area of the layers 6 of the inner part 5, the inner part 5 projects outside the outer part 3 a distance 9. Said protruding distance 9 is adapted to give a higher or lower compression in the system. In one embodiment the distance 9 is preferably about 1 mm. The inner part 5 inclines in the area between the layers 6 and the outer ends of the inner part 5, whereby the inclination is such that the inner part 5 is flush with the outer part 3, in the position where the inner part 5 meets the outer part 3.

The outer part 3 and the inner part 5 of each module half 2 are normally made of rubber of different hardness. The inner part 5 is made of a softer rubber and preferably has a hardness of 60±5 Shore A. The harder rubber of the outer part 3 has a hardness of 85±5 Shore A. In some embodiments the softer rubber material is used both for the outer part 3 and the inner part 5, whereby each module half 2 normally is made in one piece.

Figure 2:
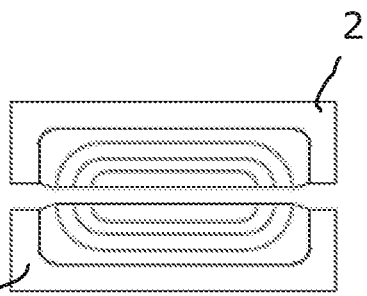
FIG. 2 is an end view of the module of FIG. 1.
Figure 3:
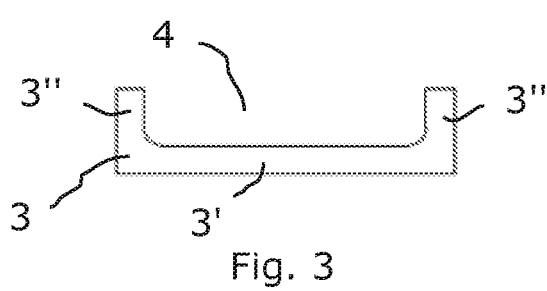
FIG. 3 is an end view of a part of the module of FIGS. 1 and 2.
Figure 4:
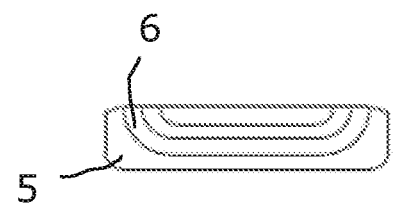
FIG. 4 is an end view of a further part of the module of FIGS. 1 and 2.
Figure 5:
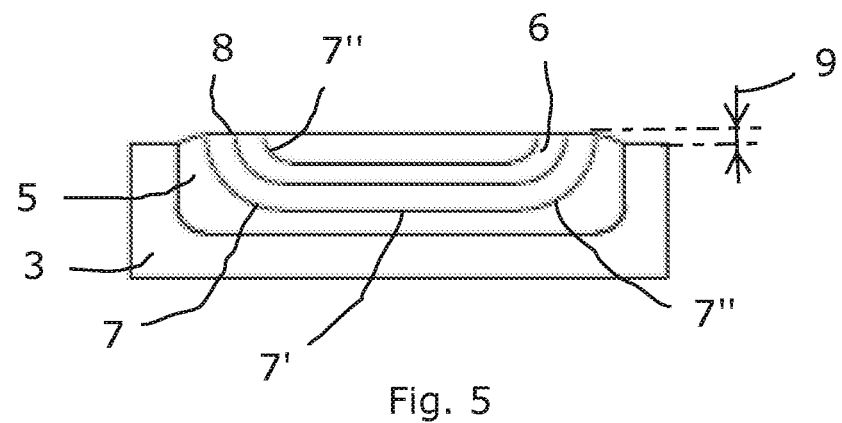
FIG. 5 is an end view of a module half of the module of FIGS. 1 and 2.
Figure 6:
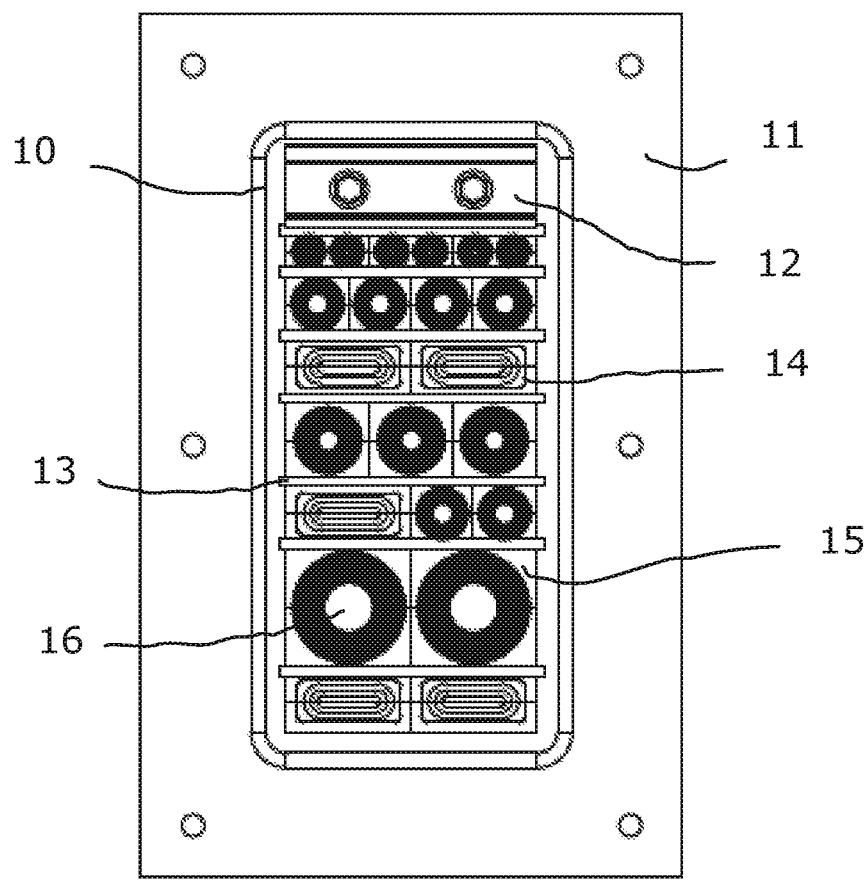
FIG. 6 is a side view of a transition in which modules of the present invention are received.

As indicated by FIG. 2 the module 1 has a rectangular form in end view.

In use one or more modules 14 according to the present invention possibly together with one or more modules 15 of a different kind are placed inside a frame 10. The frame 10 is to be placed in an opening of some kind of partition 11 in houses, ships, technical shelters etc. Inside the frame 10 also one or more compression units 12 are placed. In the shown embodiment there is one compression unit 12. To keep the modules 14, 15 safely inside the frame 10, stay plates 13 are arranged between the rows of modules 14, 15 and between the compression unit 12 and the adjacent row of modules 15. The modules 14 of the present invention are to receive flat cables. The other modules 15 are to receive circular cables and if no cable is to be received in a specific module 15 it has a blind 16 in the centre of the module 15.

When all modules 14, 15 receiving cables have been placed inside the frame 10 together with possible modules 14, 15 not receiving cables but filling out the inner space of the frame 10, the compression unit 12 is activated. By the activation the compression unit 12 will be expanded pressing on the modules 14, 15 inside the frame 10. The modules 14, 15 will thereby be pressed inwards towards the cables and outwards against the frame 10 and adjacent modules 14, 15. By means of the softer rubber material of the inner parts 5 of the modules 14 for the flat cables and by means of the protruding central part of each inner part 5, the inner part 5 will adapt to the cable.

As indicated above the exact form of the modules may be varied in many different ways, including different forms for the inner and outer parts of each module half. The thickness of the straight section 3' and/or the end sections 3" of the outer part may also be varied. By the different forms the modules are adapted to different types of cables and different demands on compression.

In FIGS. 7 to 14 different embodiments of modules and module halves are shown.

Figure 7:
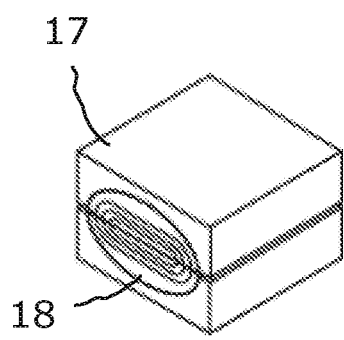
FIGS. 7-14 are perspective views of further embodiments of modules and module halves, respectively, of the present invention.

Each of the module halves of the module of FIG. 7 has an outer part 17 and an inner part 18. The module has a rectangular end view and the inner part of the module, formed of the inner parts 18 of the module halves, has an elliptic end view. In a non compressed condition the inner parts 18 will protrude a short distance above the outer parts 17.

Figure 8:
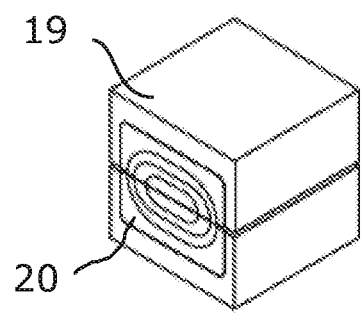

Each of the module halves of the module of FIG. 8 has an outer part 19 and an inner part 20. The module has a quadratic end view and also the inner part of the module, formed of the inner parts 20 of the module halves, has a quadratic end view. In a non compressed condition the inner parts 20 will protrude a short distance above the outer parts 19.

Figure 9:
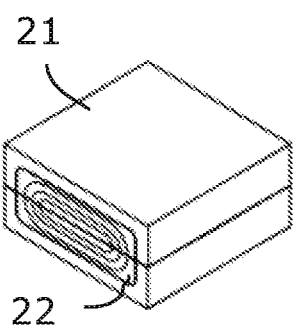

Each of the module halves of FIG. 9 has an outer part 21 and an inner part 22. The module of FIG. 9 corresponds with the module of FIG. 1, except that the inner part 22 of each module half does not protrude over but is flush with the outer part 21 in a non compressed condition.

Figure 10:
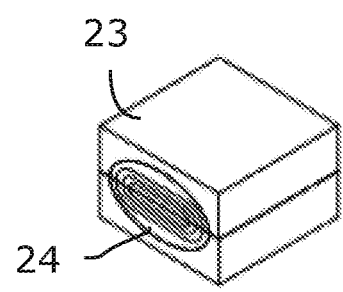

Each of the module halves of FIG. 10 has an outer part 23 and an inner part 24. The module of FIG. 10 corresponds with the module of FIG. 7, except that the inner part 24 of each module half does not protrude over but is flush with the outer part 23 in a non compressed condition.

Figure 11:
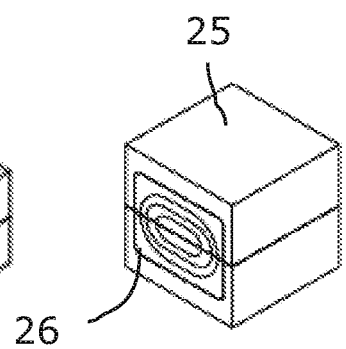

Each of the module halves of FIG. 11 has an outer part 25 and an inner part 26. The module of FIG. 11 corresponds with the module of FIG. 8, except that the inner part 26 of each module half does not protrude over but is flush with the outer part 25 in a non compressed condition.

Figure 12:
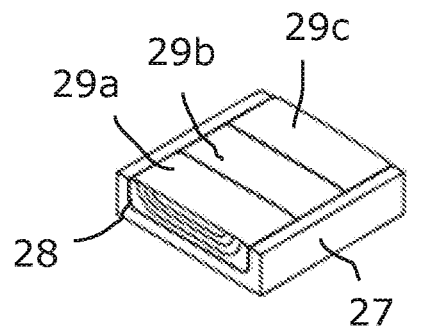

The module half of FIG. 12 has an outer part 27 and an inner part 28. The module half of FIG. 12 corresponds with the module parts of FIG. 1, except that the inner part 28 is divided into three sections 29a, 29b, 29c. The inner part 28 of the module half of FIG. 12 protrudes a short distance above the outer part 27 in a non compressed condition.

Figure 13:
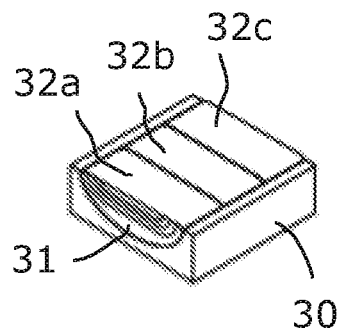

The module half of FIG. 13 has an outer part 30 and an inner part 31. The module half of FIG. 13 corresponds with the module parts of FIG. 7, except that the inner part 31 is divided into three sections 32a, 32b, 32c. The inner part 31 of the module half of FIG. 13 protrudes a short distance above the outer part 30 in a non compressed condition.

Figure 14:
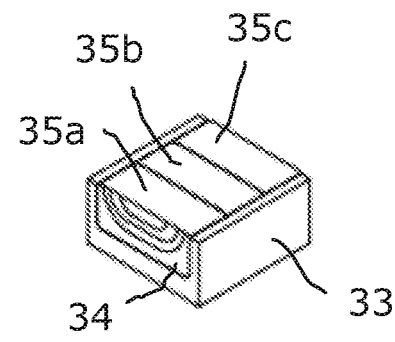

The module half of FIG. 14 has an outer part 33 and an inner part 34. The module half of FIG. 14 corresponds with the module parts of FIG. 8, except that the inner part 34 is divided into three sections 35a, 35b, 35c. The inner part 34 of the module half of FIG. 14 protrudes a short distance above the outer part 33 in a non compressed condition.

The three sections of the inner parts 28, 31, 34 of the module halves of FIGS. 12, 13 and 14 are there for manufacturing reasons. The need of separate sections depends on the depth of the module halves and the manufacturing method of the inner part.

A person skilled in the art realises that the modules and their inner and outer parts may have many different forms as seen in end view and may be combined in many different ways.

The invention claimed is:

1. A module of a seal or transition for cables or wires, which module is to be placed inside a frame together with one or more compression units, and which module comprises two module halves, wherein each module half comprises an outer part and an inner part, wherein the outer part has a straight section and two end sections at the ends of the straight section and placed perpendicular to the straight section, giving a U-form in end view, wherein the inner part is placed in a recess formed between the end sections of the outer part and wherein the inner part has a number of layers, wherein the layers of the inner part include cuts between the layers of the inner part, wherein the cuts stop short of an outer surface of the inner part such that the cuts do not extend to any part of the outer surface such that the layers of the inner part are attached to each other by a respective material bridge between each adjoining layer of the layers of the inner part, and wherein the outer surface of one module half faces the outer surface of the other module half, and wherein the inner part is made of a softer material than the outer part.

2. The module of claim 1, wherein each cut has a straight central section and curved end sections at opposite ends of the straight central section, in order to adapt the module to flat cables of different sizes.

3. The module of claim 1, wherein the material bridges have a thickness of about 0.5 mm.

4. The module of claim 1, wherein the layers have a thickness of at least 1.5 mm.

5. The module of claim 1, wherein the inner part is made of a rubber having a hardness of 60±5 Shore A and the outer part is made of a rubber having a hardness of 85±5 Shore A.

6. A module of a seal or transition for cables or wires, which module is to be placed inside a frame together with one or more compression units, and which module comprises two module halves, wherein each module half comprises an outer part and an inner part, wherein the outer part has a straight section and two end sections at the ends of the straight section and placed perpendicular to the straight section, giving a U-form in end view, wherein the inner part is placed in a recess formed between the end sections of the outer part and protrudes a distance above the outer part, wherein the inner part has a number of layers, wherein the layers of the inner part include cuts between the layers of the inner part, wherein the cuts stop short of an outer surface of the inner part such that the cuts do not extend to any part of the outer surface such that the layers of the inner part are attached to each other by a respective material bridge between each adjoining layer of the layers of the inner part, wherein the outer surface of one module half faces the outer surface of the other module half, and wherein the inner part is made of a softer material than the outer part.

7. The module of claim 6, wherein the inner part protrudes about 1 mm above the outer part.

8. The module of claim 6, wherein the module has a rectangular or quadratic form as seen in end view.

9. The module of claim 6, wherein the inner part of the module half formed by the number of layers has a circular, elliptic, rectangular or quadratic form as seen in end view.

10. The module of claim 6, wherein the inner part is attached to the outer part by an adhesive.

* * * * *